Patented Feb. 7, 1939

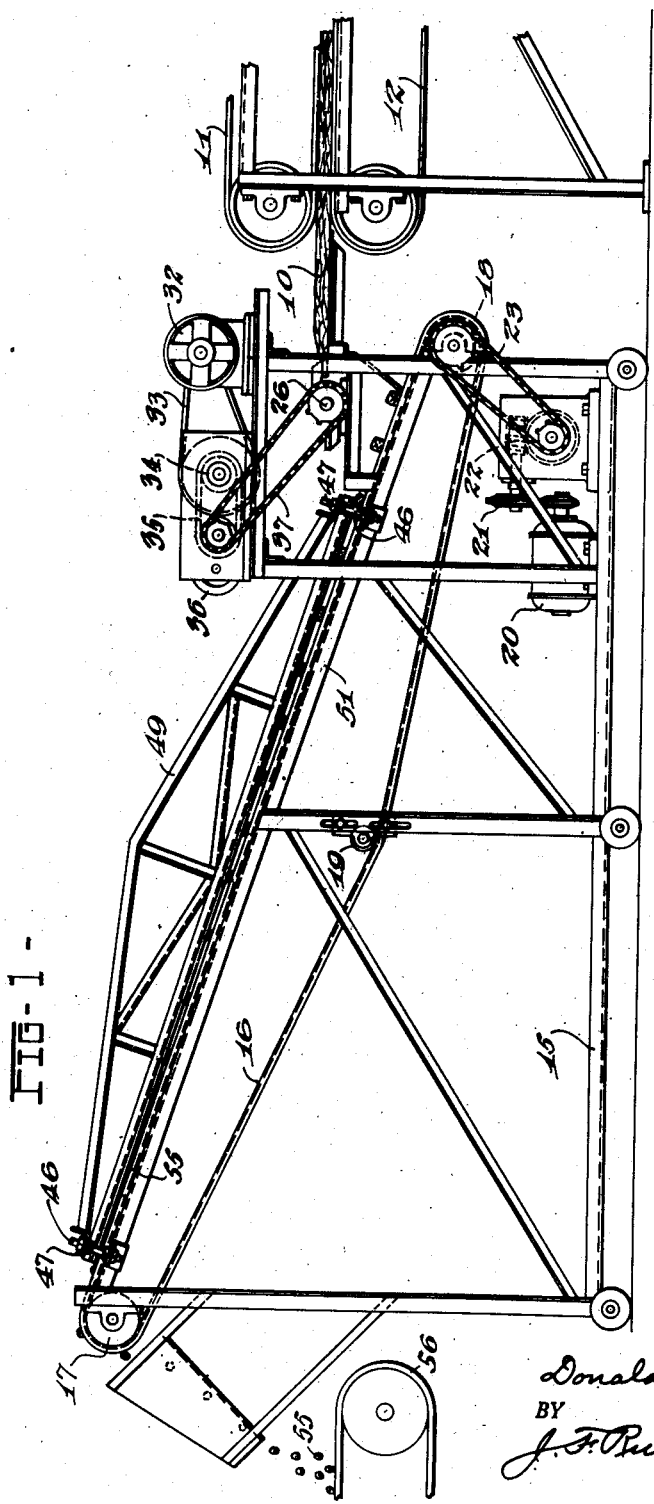

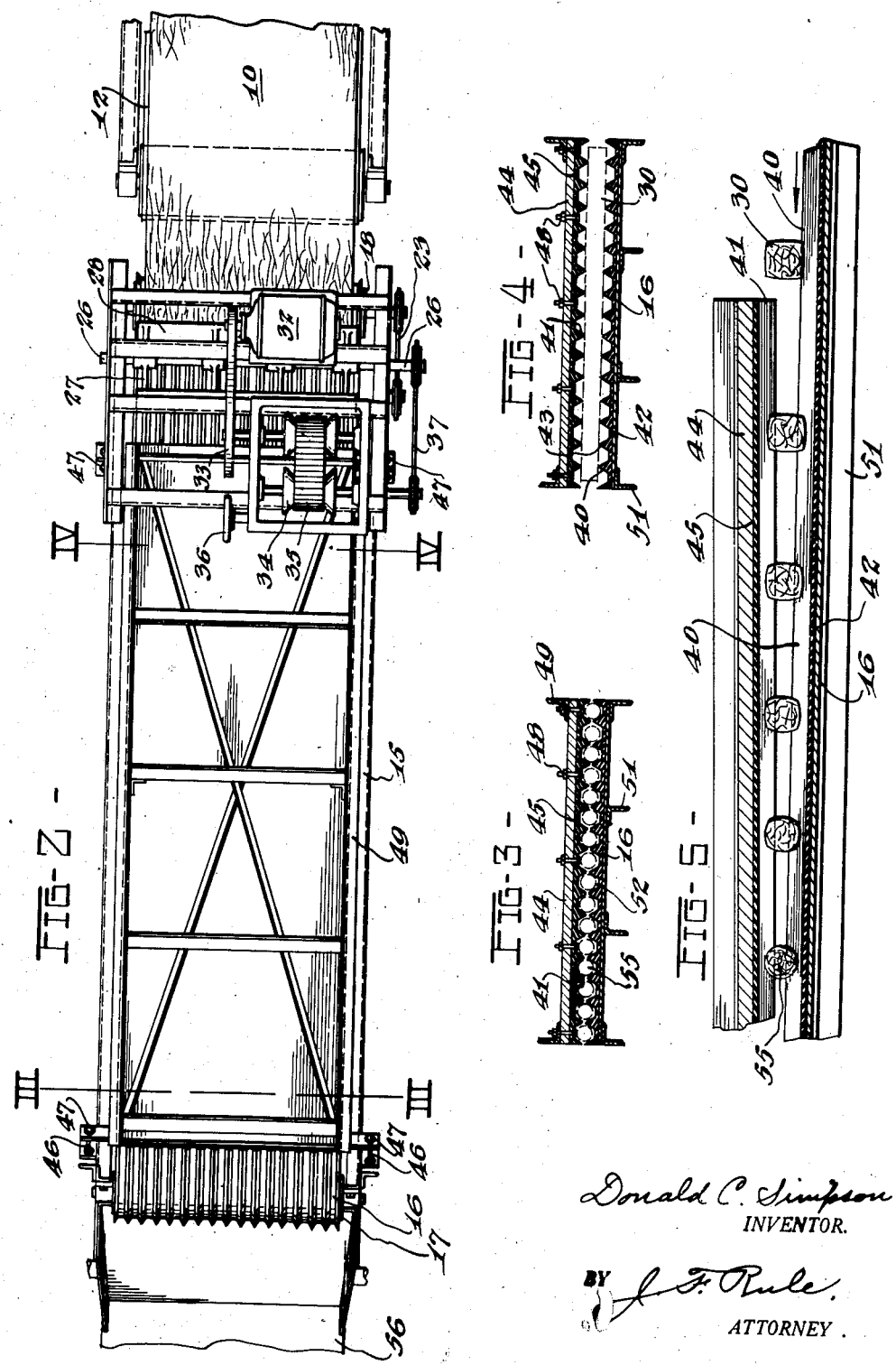

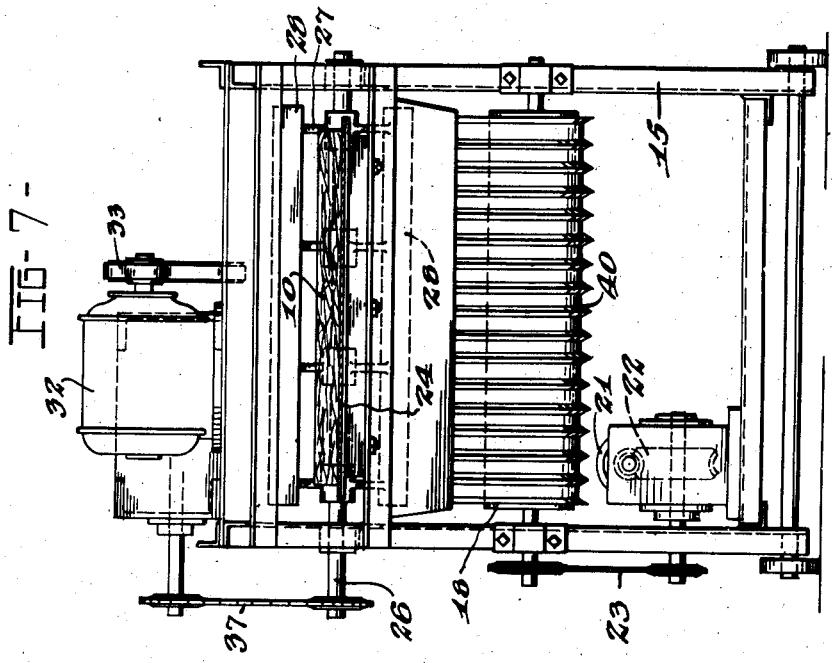
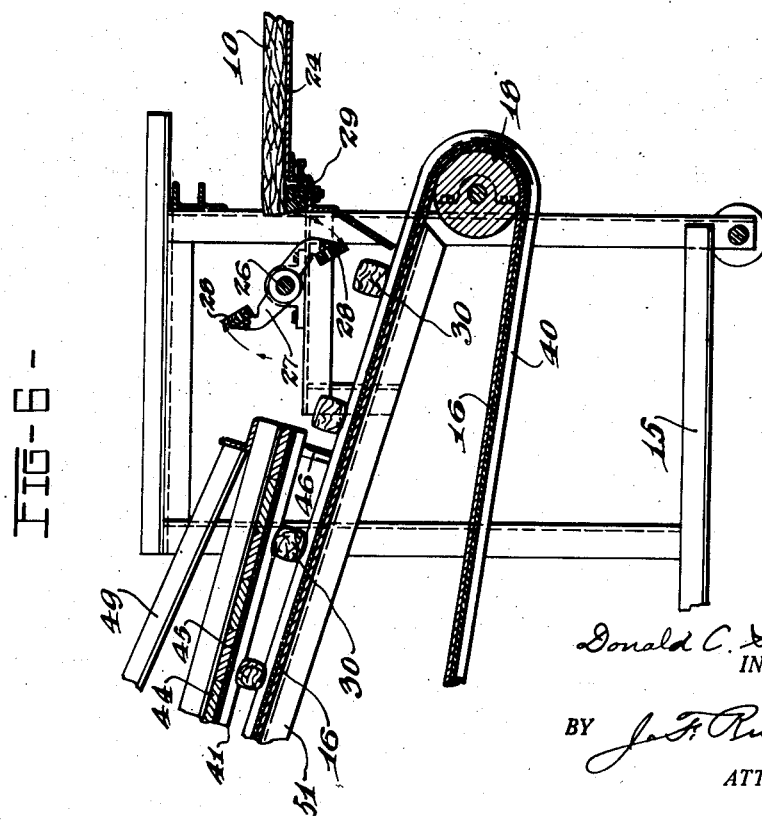

2,145,899

UNITED STATES PATENT OFFICE 2,145,899

METHOD AND APPARATUS FOR NODULIZING FIBROUS MATERIAL

Donald C. Simpson, Newark, Ohio, assignor, by mesne assignments, to Owens-Corning Fiberglas Corporation, a corporation of Delaware Application October 19, 1934, Serial No. 749,028
Renewed December 17, 1937

20 Claims. (Cl. 154—2)

My invention relates to a method of segregating a mat or the like of fibrous material into comparatively small chunks and giving them a rounded or substantially spherical shape. The invention further comprises a novel form of apparatus for practicing such method. The apparatus as herein shown is particularly adapted for nodulizing a mat or web of fibrous insulating material, as, for example, glass wool, such nodulized material being used for various purposes, as, for example, for insulating frame houses or other buildings which call for a nodulized insulation which can be poured or blown into places inaccessible for other forms of insulation.

An object of the invention is to provide a method and apparatus for making nodules of a lower density than those produced by other known methods.

A further object is to provide means for making nodules from glass wool or the like without pulverizing, destroying or breaking the individual fibers to an objectionable extent, as occurs in other known methods.

Other objects of the invention will appear hereinafter.

Referring to the accompanying drawings:

Fig. 1 is a side elevation of an apparatus designed for making balls or nodules of fibrous material in accordance with my invention.

Fig. 2 is a plan view of the same.

Figs. 3 and 4 are cross sections at the lines III—III and IV—IV, respectively, on Fig. 2.

Fig. 5 is a longitudinal section showing a portion of the nodule forming means.

Fig. 6 is a sectional side elevation of the right-hand portion of the cutting, forming and conveying mechanism.

Fig. 7 is an end view of the apparatus.

The machine, as herein shown, is adapted for forming balls or nodules from a mat or web 10 of fibrous material. The web may consist of matted fibrous material such as fibrous glass commonly known as "glass wool" and hereinafter referred to as such, although various other materials might be used with such machine.

The web 10 is continuously fed forward between upper and lower belt conveyors 11 and 12, to the nodulizing machine. The latter comprises a framework 15 which supports an endless conveyor 16 running on rolls 17 and 18. The tension of the conveyor is regulated by a take-up device 19. The conveyor is continuously driven as by means of an electric motor 20 which operates through a belt 21, worm gearing 22, and a sprocket chain 23. The speed of the motor may be regulated as usual by means of a rheostat (not shown).

The mat 10 advances over a stationary platform 24, at the forward end of which is a chopper mechanism for cutting it into narrow strips. The chopper mechanism comprises a continuously rotating shaft 26 mounted on the machine frame and extending transversely thereof, said shaft carrying arms 27 on which are mounted blades 28. Each blade, as it moves downward, engages the web 10 and cooperates with a stationary blade 29 to sever a strip 30 of wool from the mat.

The chopper shaft is driven by an electric motor 32 mounted on a platform above the chopper. The motor operates through a belt 33 and a speed changing gear mechanism, herein shown as a Reeves drive of usual construction. The latter comprises pairs of cone drive pulleys 34 over which runs a belt 35. A hand wheel 36 is operable through means (not shown) to shift the belt and thereby change the speed in a well known manner. The motion is transmitted from this drive through a sprocket chain 37 to the chopper shaft 26. By changing the speed of the chopper, the width of the strips 30 may be correspondingly changed, thereby adjustably varying the size of the nodules which are formed from said strips as hereinafter set forth.

The endless conveyor 16 is provided on its outer surface with a series of parallel ribs 40 spaced to form grooves which extend lengthwise of the conveyor. As herein shown, these ribs are formed integral with a sheet 42 of flexible material overlying and secured to the conveyor 16 so as to form a part thereof. The ribs are triangular in cross section, the side walls of each rib being tapered to an edge 43 (Fig. 4). The ribbed web 42 is preferably made of rubber, rubber composition, or other soft, flexible, resilient material.

Above the conveyor 16 and cooperating therewith is a shaping element or device comprising a stationary plate 44, on the under face of which is mounted a web 45 formed with integral ribs 41. The web 45 and ribs thereon are preferably made of the same material as the cooperating web 16 and ribs 40, the ribs 40 and 41 being of the same size and shape and arranged directly opposite each other. The plate 44, as shown, is substantially the same width as the conveyor 16 and overlies the upper lead of of the conveyor. Said plate is mounted on supporting bolts 46 at opposite ends thereof and is adjustable toward and from the conveyor by means of adjusting nuts 47. Bolts 48 (Figs. 3 and 4) serve to attach the web 45 to the plate 44 and also to secure said plate to a framework 49 which braces and stiffens the plate. Angle bars 51 extend lengthwise beneath the upper lead of the conveyor 16, preventing it from sagging and holding it accurately spaced from the plate 44.

The two shaping devices, namely, the upper shaping device 44, 45 and the lower device 16, 42 are preferably somewhat divergent, being spaced farther apart at their lower or receiving ends than at their upper ends, for a purpose described hereinafter. At the upper end of these shaping devices the ribs 40 and 41 may have their edges 43 in contact or close together, as shown in Fig. 3, while adjacent their lower ends they are spaced a considerable distance apart, as shown in Fig. 4. It will be seen that the two ribbed webs together define spaces or channels 52 each comprising a pair of opposed grooves, which channels, as shown in Fig. 3, are substantially hexagonal in cross section.

The strips 30 when chopped from the web 10, as heretofore described, fall onto the conveyor 16 therebeneath and are supported by the ribs 40. These strips, which are substantially rectangular in cross section, are carried upward and forward by the conveyor and pass beneath the ribs 41 on the stationary forming member. The relative movement of the upper and lower forming ribs imparts a rolling movement to the strips. As a strip advances it is gradually compressed between the converging edges 41 of the ribs which thereby gradually cut through it, dividing it into individual chunks or pieces. The strip is thus divided into individual chunks or nodules before it has completed its travel between the shaping devices. These severed chunks, each moving along one of the channels 52, are rolled therein to an approximately spherical shape, thereby completing the formation of the nodules 55. The latter are discharged from the upper end of the conveyor 16 to any receiving means, as, for example, a conveyor 56 (Fig. 1), or directly into a bag or other receptacle.

The soft, yielding nature of the rubber or like material which constitutes the shaping devices, permits the latter to operate effectively for forming the nodules and at the same time admits of comparatively light pressure being applied. The individual fibers are thus prevented from being broken to any extent, and the nodules retain a light, fluffy consistency which is particularly desirable when they are used for various insulating purposes. I have also found that the material specified for the shaping devices is effective in preventing the fibrous material from slipping over the contacting surfaces in a manner which would interfere with the rolling and shaping of the nodules.

Modifications may be resorted to within the spirit and scope of my invention.

I claim:

1. Apparatus for nodulizing a mat of fibrous material, which comprises a pair of shaping elements having opposing faces each formed with ribs thereon, said ribs arranged to form channels positioned side by side, means for feeding a strip of the fibrous material between said shaping elements with the strip extending transversely of said channels and imparting a rolling movement to the strip as it advances, said shaping elements including means for gradually severing the strip while it rolls, into nodules individual to said channels.

2. Apparatus for nodulizing fibrous material, which comprises shaping elements having opposite faces spaced apart, a series of parallel ribs on each of said faces, said ribs on one face being directly opposite those on the other, the ribs being arranged to provide a series of split channels extending along said elements, means for feeding a strip of matted fibrous material between the shaping elements in a direction lengthwise of the channels with said strip extending transversely across the channels, means for moving one of said elements relative to the other in a direction lengthwise of the channels and thereby rolling the strip between said elements and causing it to be formed during such rolling, into chunks or nodules individual to said channels.

3. Apparatus for nodulizing fibrous material, which comprises shaping elements having opposite faces spaced apart, a series of parallel ribs on each of said faces, said ribs being arranged to provide a series of channels extending along said elements, means for feeding a strip of matted fibrous material between the shaping elements in a direction lengthwise of the channels with said strip extending transversely across the channels, means for moving one of said elements relative to the other in a direction lengthwise of the channels and thereby rolling the strip between said elements, the opposite ribs on the said elements being convergent in the direction of movement of the said strip and thereby operable to gradually sever the strip into separate nodules individual to said channels.

4. A nodulizing machine comprising a pair of shaping elements having opposing faces, each of said faces being provided with a series of parallel ribs, the ribs on said faces together forming a series of channels extending along said forming elements, and means for moving one of said elements relative to the other in a direction lengthwise of the channels.

5. A nodulizing machine comprising a pair of shaping elements having opposing faces, each of said faces being provided with a series of parallel ribs, the ribs on said faces together forming a series of channels extending along said forming elements, and means for moving one of said elements relative to the other in a direction lengthwise of the channels, said ribs having opposite edges for severing strips of fibrous material fed between said forming elements.

6. A nodulizing machine comprising a pair of shaping elements having opposing faces, each of said faces being provided with a series of parallel ribs, the ribs on said faces together forming a series of channels extending along said forming elements, and means for moving one of said elements relative to the other in a direction lengthwise of the channels, said ribs having opposite edges for severing strips of fibrous material fed between said forming elements, said elements consisting of soft, resilient material.

7. In an apparatus for nodulizing fibrous material, the combination of a traveling conveyor comprising a series of parallel ribs extending lengthwise thereof, a shaping element facing said conveyor and formed with ribs parallel with the ribs on the conveyor and forming therewith a series of channels, and means for causing strips of fibrous material to be fed forward between said conveyor and the said shaping element, said ribs being arranged to engage and roll said strip and gradually sever it into nodules individual to said channels.

8. In an apparatus for nodulizing fibrous material, the combination of a traveling conveyor comprising a series of parallel ribs extending lengthwise thereof, a shaping element facing said conveyor and formed with ribs parallel with the ribs on the conveyor and forming therewith a series of channels, the ribs on said shaping element being arranged opposite those on the conveyor and convergent therewith in the direction of travel of the conveyor, whereby strips of fibrous material extending transversely of the conveyor and fed forward therewith are rolled between said ribs and gradually severed thereby into nodules individual to the said channels.

9. Apparatus for nodulizing fibrous material, which comprises means for advancing a matted web of said material, means for periodically severing transverse strips from the forward end of the web, a traveling conveyor arranged to receive said strips, a forming plate positioned over the conveyor, ribs on and extending lengthwise of the conveyor and said plate and together forming channels, the ribs on said plate being spaced from those on the conveyor to permit said strips to pass therebetween and to impart rolling movement to said strips as they advance with the conveyor.

10. Apparatus for nodulizing fibrous material, which comprises means for advancing a matted web of said material, means for periodically severing transverse strips from the forward end of the web, a traveling conveyor arranged to receive said strips, a forming plate positioned over the conveyor, ribs on and extending lengthwise of the conveyor and said plate and together forming channels, the ribs on said plate being spaced from those on the conveyor to permit said strips to pass therebetween and to impart rolling movement to said strips as they advance with the conveyor, said forming plate and the conveyor being convergent in the direction of travel of the conveyor, said ribs being formed with severing edges arranged to gradually sever the strips as they advance along the forming plate, the ribs being shaped and arranged to form the lateral walls of channels which are substantially hexagonal in cross section adjacent the forward end of said forming plate.

11. A machine for nodulizing fibrous material, which comprises means for feeding a matted web of the material, means for chopping strips from the advancing forward end of the web, an endless traveling conveyor in position to receive said strips with the latter arranged transversely of the conveyor and causing said strips to advance with the conveyor, and means cooperating with the conveyor to sever each said strip into a plurality of individual chunks or nodules as the strips advance with the conveyor, said means adapted to individually roll said chunks to form nodules having cross-sections smaller than the cross-sections of said original strips.

12. A machine for nodulizing fibrous material, which comprises means for feeding a matted web of the material, means for chopping strips from the advancing forward end of the web, an endless traveling conveyor in position to receive said strips with the latter arranged transversely of the conveyor and causing said strips to advance with the conveyor, shaping ribs on the conveyor extending lengthwise thereof, and means cooperating with the conveyor and said shaping ribs for rolling said strips as they advance with the conveyor and segregating each strip as it rolls, into chunks or nodules and rolling said nodules into substantially spherical form.

13. A machine for nodulizing fibrous material, which comprises means for feeding a matted web of the material, means for chopping strips from the advancing forward end of the web, an endless traveling conveyor in position to receive said strips with the latter arranged transversely of the conveyor and causing said strips to advance with the conveyor, shaping ribs on the conveyor and extending lengthwise thereof, a stationary shaping plate overlying the conveyor and spaced therefrom, said plate having ribs cooperating with the ribs on the conveyor to form the side walls of channels extending lengthwise of the conveyor, said ribs having severing edges by which the strips are severed into nodules individual to said channels.

14. The method of forming nodules of fibrous material, which comprises rolling a strip of the material and advancing said strip while rolling, between pairs of oppositely disposed convergent severing edges engaging the strips at intervals lengthwise thereof, thereby severing the strips into individual chunks, rolling said chunks to approximately spherical form, and reducing the cross-sectional size of said chunks to form matted nodules.

15. The method of forming nodules of closely matted fibrous material, which comprises rolling about its longitudinal axis a strip of the material which is substantially rectangular in cross-section, causing the strip while rolling to advance between pairs of oppositely disposed convergent severing edges which engage the strip at intervals lengthwise thereof, severing thereby the strip transversely at a plurality of points lengthwise thereof during the rolling of the strip to form individual chunks, and reducing the cross-sectional size of said chunks to form matted nodules.

16. The method of forming nodules of fibrous material which comprises forming a strip of fibrous material, rolling said strip, applying pressure to the strip during its rolling action to reduce its cross-sectional size, and applying concentrated pressure at regular intervals along the said strip during said rolling action, thereby severing said strip at said intervals into a plurality of individual chunks of material.

17. The method of forming nodules of fibrous material which comprises forming a strip of fibrous material, rolling said strip, applying pressure to the strip during its rolling action to reduce its cross-sectional size, and applying concentrated pressure at regular intervals along the said strip during said rolling action, thereby severing said strip at said intervals into a plurality of individual matted nodules, each having a cross-sectional size smaller than the original cross-sectional size of said strip.

18. The method of forming nodules of matted fibrous material, which comprises rolling a strip of matted fibers between and in the direction of convergence of approximately parallel convergent surfaces spaced to receive said strip and thereby causing the strip as it rolls to be gradually compressed between the converging surfaces and thus reduced in cross-sectional size, and during said reduction gradually severing the strip at intervals along its length into a plurality of individual chunks or nodules.

19. The method of forming nodules of matted fibrous material which comprises advancing a strip of matted fibrous material in a direction transverse to its length between converging surfaces spaced to receive said strip and causing a compacting of the strip by the pressure thereon of said converging surfaces, and gradually severing said strip at intervals along its length, concomitantly with said compacting operation and thereby producing a plurality of individual chunks or nodules of the material.

20. The method of forming nodules of matted fibrous material which comprises advancing a strip of matted fibrous material in a direction transverse to its length between converging surfaces spaced to receive said strip and causing a compacting of the strip by the pressure thereon of said converging surfaces, and causing a concentrated pressure of said surfaces at predetermined intervals along said strip during said compacting action by which the strip is severed into a plurality of individual chunks or nodules.

DONALD C. SIMPSON.